Oct. 4, 1927.

F. C. RAWOLLE 1,644,491

PROCESS OF DECOLORIZING, TREATING AND DISSOLVING
SHELLAC FOR BLEACHING PURPOSES

Filed Aug. 31, 1923          2 Sheets-Sheet 1

INVENTOR.
Frederick C. Rawolle
BY
Frank J. Wood
ATTORNEY.

Patented Oct. 4, 1927.

1,644,491

UNITED STATES PATENT OFFICE.

FREDERICK C. RAWOLLE, OF SALEM, CONNECTICUT.

PROCESS OF DECOLORIZING, TREATING, AND DISSOLVING SHELLAC FOR BLEACHING PURPOSES.

Application filed August 31, 1923. Serial No. 660,433.

My invention relates to an improved process for the partial decolorizing and dissolving of substances of a gummy nature, more particularly shellac. It has for its object a process and plant by means of which the partial decolorizing, the treatment and the subsequent dissolving is effected in a more thorough, rapid and economical manner than by means of processes hitherto employed.

The improved process primarily consists in extracting in a continuous novel way, much of the natural soluble coloring matters of the shellac in a flow of warm water. In this water the shellac is heated to a temperature that will soften it to a plastic state and in this state the sticky mass is cut, shredded, torn and mixed together, always in intimate contact with a flow of warm water. This water in contact with the ever changing surfaces of the stretching, stringy mass dissolves the exposed coloring matter. Incidently there takes place an important action that is of great advantage. I have found that the stretching of the stringy mass of shreds underneath the surface of warm water will uncover and open up the cells of wax that is mixed in with the crude shellac. Unless this wax is freed of the cell coverings and is thoroughly incorporated in the shellac the deficiency of this wax is very apparent in the bleached product and in consequence the quality is impaired. Besides the efficiency in the decolorizing action by the shredding and stretching this stringy mass, the effectiveness of this treatment in opening up the cells when at comparatively low temperatures and thoroughly incorporating the wax with the shellac is very noticeable after the shellac has been bleached and is ready to be used. The plastic mass in a later step mixes in with a warm alkaline solution into which it eventually dissolves. After filtering it is ready to be used for the various purposes known to shellac refiners.

Figure 1:
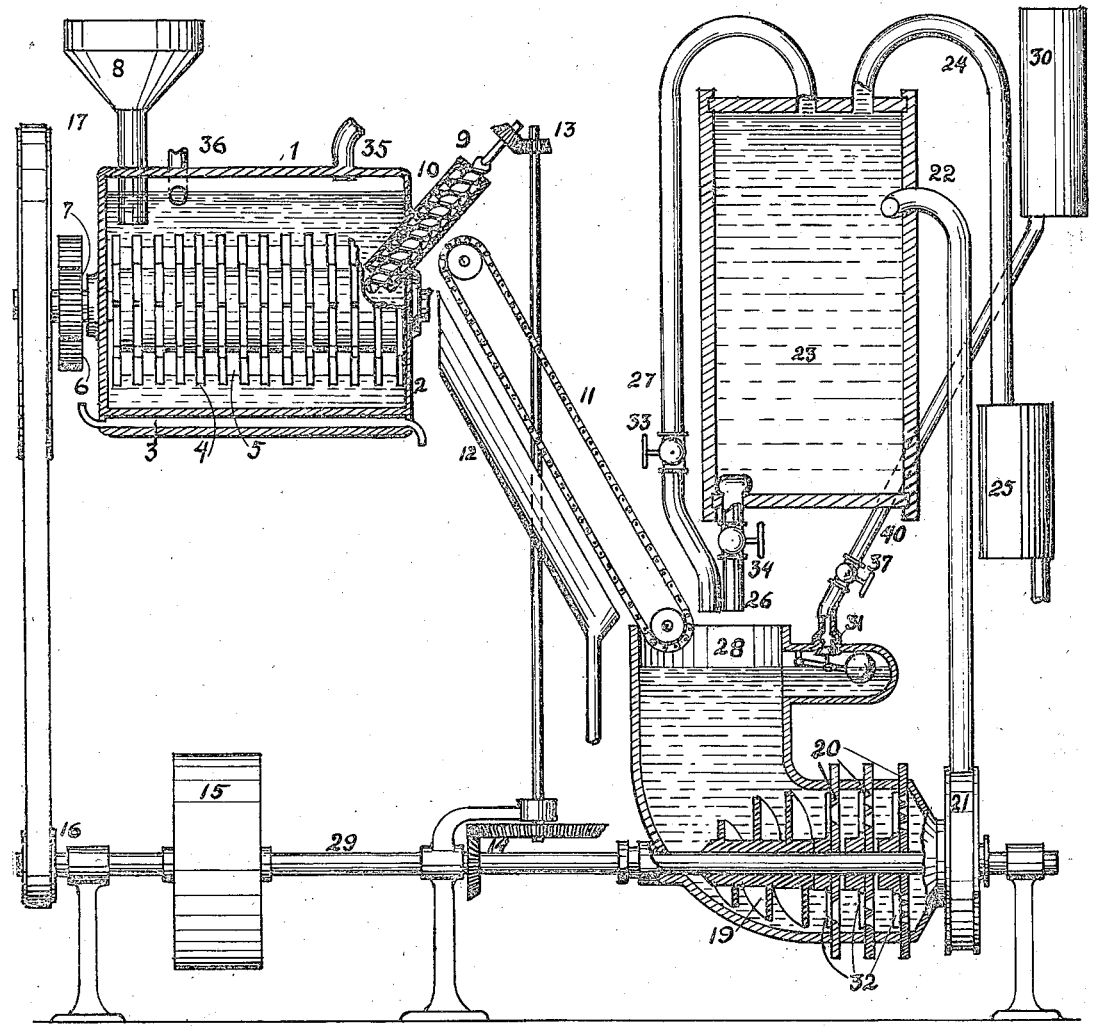
Figure 2:
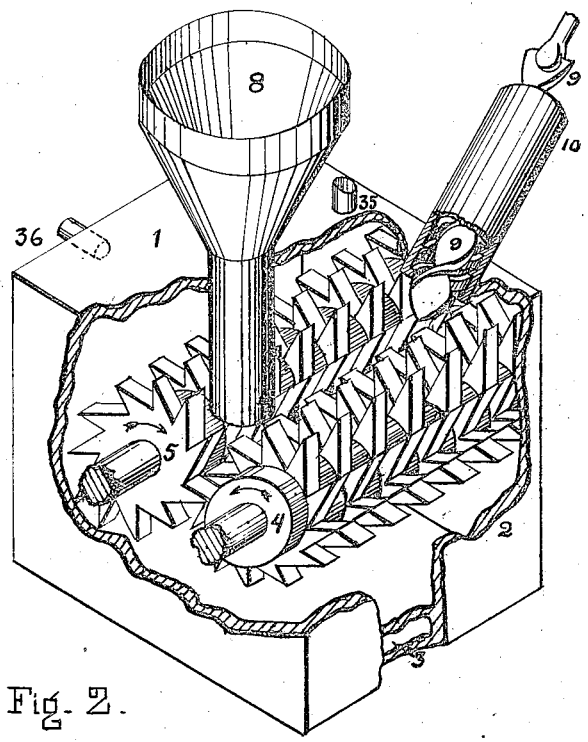
Figure 3:
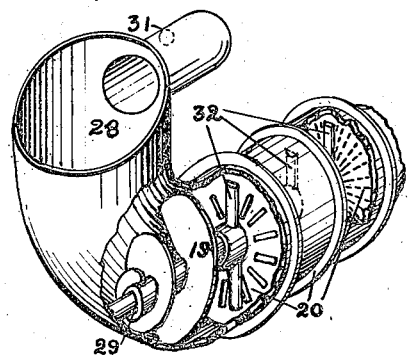

In the accompanying drawings, showing in a somewhat diagrammatic way, is an illustrative embodiment of this invention. Fig. 1, is an outline of the working features of the whole process. Fig. 2, is a perspective view of the machine for shredding, showing the interior. In this view the portion of the outside walls that obstructs the view is shown broken away. Fig. 3, is a perspective view of the disintegrating and dissolving feature. A portion of the enclosing walls is here shown broken away in order to more clearly illustrate the interior.

Similar numerals refers to similar parts in each of the views.

In Fig. 1, the shredding machine 1, consists of a hollow box or tank 2. The lower portion is formed of double walls, the space, 3, between, being adapted to act as a steam jacket for heating. The pair of cylinders, 4 and 5, each have circumferential rows of large saw teeth. These rows of teeth alternate longitudinally along the cylinders with circumferential grooves. The pair of cylinders are mounted rotatably in bearings that are located in the end walls of the box, 2. The axial lines of the cylinders are at such a distance apart that the rows of teeth of the cylinder, 4, pass through the grooves that are between the rows of teeth of the cylinder, 5. In the same manner the teeth of cylinder, 5, pass through the grooves of cylinder, 4. Rotary motion is communicated from the cylinder 4, to cylinder 5, by the gears 6 and 7. The gear, 6, meshes into the gear, 7, and is larger in diameter in order that the rotative speed of the cylinder, 4, will be greater than that of the cylinder, 5. The teeth of the two cylinders, as they rotate in conformity with the motion of the gears, always have a closing in and downward motion at the moment the teeth of the one cylinder reach the points of nearest approach to the teeth of the other. The shellac as it feeds down from the hopper, 8, on to one end of the pair of cylinders 4 and 5, is at first crushed between the teeth and it then adheres to the warmed sticky shellac that has previously been fed on to and is already adhering to the cylinders. Continued feeding causes a larger mass to accumulate. As this accumulation increases it travels longitudinally from the "feeding on" end toward the "taking off" end of the pair of cylinders. At the "taking off" end there projects the end of the worm, 9, into the recess formed between the teeth of the two cylinders. This recess is just above the intersecting points of the circles described by the teeth as they roll together. This worm is in the form of a large spiral screw which, as it rotates, spirals upward. It rotates inside the casing, 10, which is stationary. Inside this casing, 10, there is, integral with the casing, an internal screw thread that is pitched in the direction that will convey the soft shellac upwardly along with the worm while it rotates. Power to drive the worm is transmitted through the bevel gears, 13 and 14, and the connecting shafting. The shellac eventually reaches the top of the casing, 10, and falls on to the link belt 11. This link belt is of suitable width and length to receive the shellac lumps that discharge from the casing, 10, and convey them down into the receiving tank, 28. Water that happens to come through the casing, 10, along with the shellac falls through the openings in the link belt into and out through the trough, 12. Power is applied to the pulley, 15, which turns the shaft, 29. The pulley, 16, on this shaft transmits power to the pulley, 17, which drives the gear 6, to which reference has already been made. Rotating with the shaft, 29, in the tank 28, is a screw propeller, 19. This propeller induces a mixture to move toward the perforated plates, 20. Mounted on the shaft, 29, are the rotating knives, 32. These rotating knives pass over the surfaces of plates, 20, and cut into more or less small pieces, the lumps of shellac that are carried by the flow of liquor against the perforations in the plates, 20. These perforations are oblong in shape and have the largest openings in the first plate or the one nearest to the propeller, 19. The perforations in the next of the series of plates, 20, are somewhat smaller than those in the first plate. In each of the succeeding plates the perforations become smaller and smaller. The longer or radial dimensions of the perforations in any one of the series of plates, 20, measure greater than the width of the perforations in the plate preceding along the line of flow of the liquor. Obviously a lump of shellac coming through a perforation from one plate can not entirely fill up any one of the smaller holes in the next plate. The oblong shape will permit the flow of liquor to pass to one or both sides of the lump. The centrifugal pump, 21, withdraws the liquor as it flows through the series of perforated plates, 20, and forces it up through the pipe, 22, and then discharges into tank, 23. The discharge end of this pipe, 22, is directed tangentially to the curvature of the circular shell of the tank, 23, in order to induce a rotary movement to the body of liquor contained therein. This rotary motion tends to throw by centrifugal action any accummulation of lumps that have become massed together and which due to greater density than the liquor, drift further and further away from the center of rotation. The purpose of the pipe, 26, is to catch and return these lumps to the receiving tank, 28, at such times that lumps may accumulate but dissolve slowly. The valve, 34, on this pipe, 26, is normally closed but at times when lumps accumulate, it is opened and the lumps are then worked over again. Floating accumulations move to the center of rotation in the tank, 23, and when desired are returned to the receiving tank, 28, through the pipe, 27, by opening the valve, 33. The liquor from tank, 23, is finally discharged through the pipe, 24, to the filter, 25, where the dissolved and filtered shellac solution is ready for any further use desired. A solution of carbonate of soda or other solvent is contained in the tank, 30. When valve, 37, is opened, it flows to the receiving tank, 28. The float valve, 31, controls the level in this receiving tank, 28. In operation warm water flows into the box, 2, through the pipe, 35, in a continuous stream. As it is in contact with the shellac that is being worked the coloring matter is dissolved and passes out with the warm water through the overflow pipe, 36. Coarse lumpy shellac is passed continuously through the hopper, 8, to one end of the pair of cylinders, 4 and 5. These cylinders in working crush, tear and shred the soft gummy shellac which has become heated by the warm water to a temperature of about 140 degrees Fahr. This shredding and stretching of the stringy material causes the much desired wax constituent of the crude shellac to be released from the cells or coverings that ordinarily prevent this wax from mixing in desired amounts with the other constituents of shellac. It is very important that sufficient working be given the shellac in the shredding step of the process, for the quality of the product largely depends on whether or not the wax is completely freed from the minute cells that are known to exist in crude shellac. Methods heretofore employed in working crude shellac, usually produce a quality that is deficient in wax. While the wax is being worked and forced from inside of the coverings of the cells, it is mixed with the other constituents thoroughly to form a homogeneous mass. It passes longitudinally along the two cylinders—all the while being torn, shredded and stretched—as the cylinders rotate. This longitudinal movement is a continuous one, that is—as the shellac is fed in continuously at one end of the pair of cylinders it moves slowly longitudinally along until it is taken out continuously at the other end by the worm, 9. As the shellac from the worm, 9, passes from the casing, 10, over the link belt, 11, to the receiving tank, 28, it submerges in the carbonate of soda solution which flows into the receiving tank, 28, through the pipe, 40, from the tank, 30. The first mixing contact between the shellac and the dissolving carbonate of soda solution occurs in this receiving tank, 28, near the propeller, 19. The shellac is cut into smaller and smaller pieces—all the while dissolving—as it is worked through the perforated plates, 20.

The violent action of the centrifugal pump, 21, aids in further dissolving, and the rapid rotation induced by the jet action in the tank, 23, dissolves the few minute pieces of shellac that remain, provided of course that no abnormal conditions prevail or no unusually bad qualities of crude shellac are worked in the apparatus. The alkaline solution of shellac leaves the tank, 23 through the pipe, 24, and passes through a filter, 25.

What I claim is:—

1. The process of partially decolorizing, working, and dissolving crude shellac which consists in heating crude shellac under water until it becomes plastic, partially decolorizing it, shredding it, stretching it while plastic, withdrawing plastic lumps from submergence, separating decolorizing water from the lumps, immersing the plastic shellac in a current of dissolving solution, cutting the lumps smaller and smaller while immersed in the current of the dissolving solution and then subjecting the smallest lumps to a violent agitation and dissolving action.

2. The process of partially decolorizing, working, and dissolving crude shellac, which consists in heating crude shellac under water until it becomes plastic, partially decolorizing it, shredding it, stretching it while plastic, withdrawing plastic lumps from submergence, separating decolorizing water from the lumps, immersing the plastic shellac in a current of dissolving solution, cutting the lumps smaller and smaller while immersed in the current of the dissolving solution and subjecting the smallest lumps to a violent agitation and finally filtering the solution.

3. A step in the process of decolorizing, working, and dissolving crude shellac consisting of feeding warm shellac in the plastic state into a flow of dissolving solution, the said flow exerting an intense dissolving action, by flowing under pressure along with grains of plastic shellac that only partially close orifices that prevent the free passage of the said grains.

4. A step in the process of dissolving shellac consisting of using the pressure induced by a forced flow of dissolving solution passing through orifices to hold by said pressure grains of plastic shellac partially covering over said holes and cutting the grains to a size that will pass through said orifices.

5. A step in the process of partially decolorizing, working and dissolving crude shellac consisting of subjecting lumps of plastic shellac to a dissolving action in a continuous flow of dissolving fluid, momentarily withholding said lumps from being carried along in the flow, and releasing them into the flow by cutting the lumps into smaller sub-divisions.

6. A step in the process of partially decolorizing, working and dissolving crude shellac consisting of subjecting lumps of plastic shellac to a dissolving action in a continuous flow of dissolving fluid, momentarily withholding said lumps from being carried along in the flow, releasing them into the flow by subdividing them into smaller lumps, then successively withholding the subdivided lumps from being carried along in the flow and releasing them into the flow by subdividing them into still smaller lumps.

7. The process of partially decolorizing, working and dissolving crude shellac consisting of subjecting crude shellac to a heating treatment immersed in water, heated to a state of plasticity, decolorizing, shredding and stretching them during immersion, withdrawing the plastic lumps from submergence, separating decolorizing water from the lumps, subjecting the plastic lumps of shellac to immersion in a continuous flow of a dissolving fluid, momentarily withholding said lumps from being carried along in the flow, releasing them into the flow by subdividing into smaller lumps, successively withholding the subdivided lumps from being carried along in the flow and releasing them by cutting the lumps into still smaller subdivisions then subjecting the last of the undissolved subdivisions to a violent rotative agitation in the dissolving fluid.

8. A step in the process of partially decolorizing, working and dissolving crude shellac consisting of subjecting lumps of plastic shellac to a dissolving action in a continuous flow of dissolving fluid, momentarily withholding said lumps from being carried along in the flow, releasing them by cutting the lumps into smaller sub-divisions, subjecting the undissolved subdivisions to a violent rotative agitation, collecting any remaining undissolved particles and returning them for second subdividing and dissolving treatment.

9. A step in the process of partially decolorizing, working and dissolving crude shellac consisting of carrying lumps of plastic shellac along in a flow of dissolving fluid, then retarding the free movement of said lumps but intensifying the dissolving action by causing the flow to divide and pass around the surfaces of said lumps.

FREDERICK C. RAWOLLE.